Figures 2, 3:
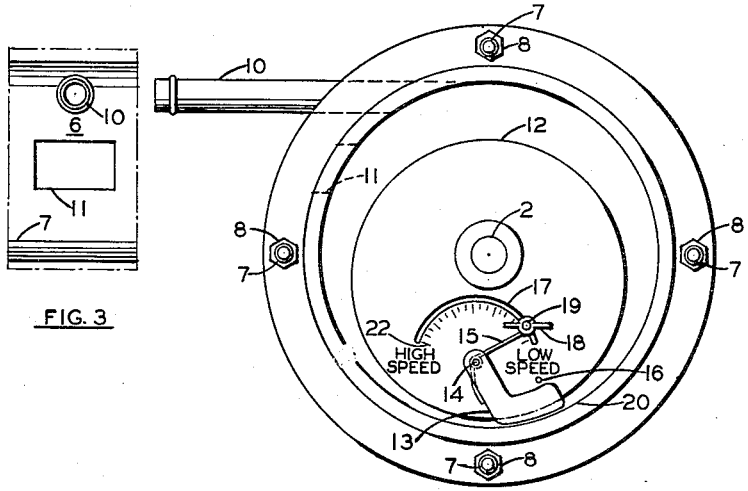

July 10, 1951          J. S. HIGH                    2,559,620
                     AIR DRIVEN SHAKER
                    Filed Dec. 17, 1946

INVENTOR.
                          JURJEN S. HIGH, DECEASED
                     BY   BY RIE HIGH, EXECUTRIX

F. J. Schmitt
                                    ATTORNEY

Patented July 10, 1951

2,559,620

UNITED STATES PATENT OFFICE 2,559,620

AIR DRIVEN SHAKER

Jurjen S. High, deceased, late of Philadelphia, Pa., by Rie High, executrix, Philadelphia, Pa.

Application December 17, 1946, Serial No. 716,698

3 Claims. (Cl. 259—1)

(Granted under the act of March 3, 1883, as amended April 30, 1928; 370 O. G. 757)

This invention relates to new and useful improvements in pneumatic shakers adapted to produce vibrations in objects mounted thereon, wherein the control of the speed of the unbalanced rotating weight in said shaker by means of a spring-loaded brake actuated by centrifugal force sustains vibrations of any selected amplitude and frequency within the limits of the design. These vibrations can be maintained as a constant, for long periods of time, regardless of slight variations in operating air-pressure. Variations in the tension of an adjustable coil-spring control the centrifugal speed at which the brake becomes effective for any desired frequency, within the range of the device, at which it is desired to operate. The device is adapted to test articles subject to vibratory service to continuous vibration so as to determine their "life" under various applicable limits of vibration frequency and amplitude.

The unbalanced weight of this shaker is rotated by a stream of compressed air entering the housing tangentially to the outer circle of rotation of the unbalanced weight and exhausting through a port located close to the rear of the entrance port of said air stream. No intake or exhaust valves, other than the air-supply valve, are necessary, as the unbalanced weight is revolved around the housing axis by the steady stream of air flowing through the housing from the entrance port to the exit port.

The brake shoe is hinged to the unbalanced weight so that, as this weight revolves about the housing axis, the centrifugal force impinges the shoe on the brake drum with a pressure in direct proportion to the speed of rotation of the unbalanced weight. A coil spring is attached to said brake shoe near the hinge point of said brake shoe to apply torque in a direction opposite to that of the centrifugal force acting on said brake shoe. The resulting braking pressure acting on the brake drum can be varied to hold any required speed at a practically constant R. P. M. by adjusting said coil spring. Different speeds of rotation for the unbalanced weight are also obtainable by controlling the air supply.

The principal object of this invention is to provide a vibrator or shaker comprising a pneumatically driven, rotatable, unbalanced weight, the speed of which is regulated by the friction of a brake shoe actuated centrifugally and counterbalanced by the torque produced by an adjustable coil-spring.

Another object is to provide a vibration-producing device having a rotatable, unbalanced weight, the speed of which is governed by a brake shoe actuated by centrifugal force, and counterbalanced partially by an adjustable, torque-producing coil-spring acting on said brake shoe, so as to hold said speed at a constant R. P. M. for each torque setting of the coil.

Still another object is to provide an air-driven shaker that operates on the air-turbine principle, with a rotatable, unbalanced weight acting as a vane located in the airstream flowing circumferentially in said shaker housing and driving said weight about its axis of rotation without the use of any pressure-regulating valves other than the air-supply-line valve.

Figure 1:
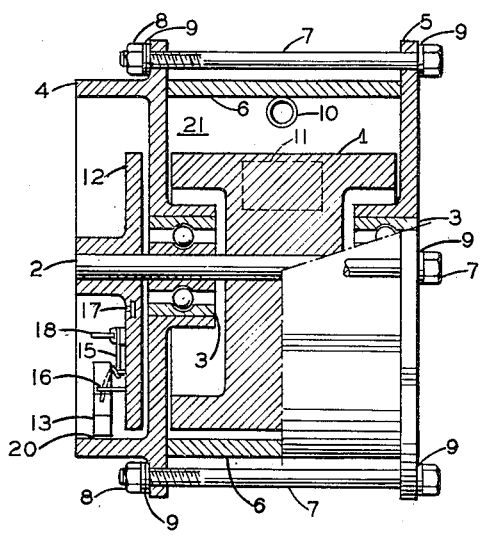

These and other objects of embodiments of the invention, and the various features and details of the construction, operation and use thereof, are hereinafter more fully set forth and described with reference to the accompanying drawing, in which like numbers refer to like parts, and in which Fig. 1 is a partial sectional view through the center of the device;

Fig. 2 is an end view showing the adjustable, centrifugally actuated, braking mechanism; and Fig. 3 is a partial elevation view showing the air intake and exhaust ports.

Numeral 1 designates the rotatable, unbalanced weight mounted on shaft 2, which is carried by ball bearings 3. End plates 4 and 5 support ball bearings 3 and are spaced by housing 6, which is clamped in position by bolts 7, nuts 8, and washers 9. Air intake 10 permits air to enter chamber 21 tangentially to the direction of rotation of the unbalanced weight 1. After passing circumferentially through chamber 21 and driving unbalanced weight 1, the air passes out of housing 6 through port 11. Flange 12 is an additional unbalanced weight that is mounted on and rotates with shaft 2, which also carries unbalanced weight 1. Brake shoe 13 is rotated on pin 14, as a bearing, by the action of centrifugal force when said force overcomes the resistance of the adjustable spring 15, which is locked in any definite position in T-slot 17 by wing nut 18 threaded to T-bolt 19. Brake shoe 13 does not contact the brake drum surface at 20 until the rotation of the unbalanced weight 1 and flange 12 reach a speed at which the centrifugal force overcomes the opposite-direction force of adjusting spring 15. When the brake is applied, the speed of said unbalanced weight 1 is reduced. Such speed reduction reduces the pressure of said brake shoe 13 on the brake-drum surface at 20 and the cycle is repeated, so that a speed governing action is maintained. In this manner, the speed variation of the rotatable, unbalanced weight is controlled within the desired limits for any adjustments of the spring 15 in slot 17. Pin 16 is a stop to prevent back-lash of brake 13. The graduations 22 are for convenience in setting spring tension.

While a particular embodiment of this invention has been illustrated and described herein, it is not intended that this invention be limited to such disclosure, and changes and modifications in the device can be made within the scope of the claims.

The invention described herein may be manufactured and used by or for the Government of the United States of America for governmental purposes without the payment of any royalties thereon or therefor.

What is claimed is:

1. A pneumatically driven shaker comprising a housing and a pair of end plates defining a chamber, a first unbalanced weight mounted rotatably in said housing on a shaft journaled in said end plates, said housing having an inlet port adapted to permit air under pressure to enter said chamber tangentially to the direction of rotation of said weight, and having an outlet port, a second unbalanced weight carried on said shaft, and a spring-retarded brake-shoe mounted rotatably on said second weight, said brake-shoe being positioned to engage an annular member extending from an end plate frictionally upon rotation of said weights at a predetermined speed.

2. A pneumatically driven shaker comprising a housing and a pair of end plates defining a chamber, a first unbalanced weight mounted rotatably in said housing on a shaft journaled in said end plates, said housing having an inlet port adapted to permit air under pressure to enter said chamber tangentially to the direction of rotation of said weight and having an outlet port, a second unbalanced weight carried on said shaft, and a spring-retarded brake-shoe mounted rotatably on said second weight, said brake-shoe being positioned to engage an annular member extending from an end plate frictionally upon rotation of said weights at a predetermined speed, and to be released from such engagement upon decrease of the speed of rotation of said weights below a predetermined rate.

3. A pneumatically driven shaker comprising a housing and a pair of end plates defining a chamber, a first unbalanced weight mounted rotatably in said housing on a shaft journaled in said end plates, said housing having an inlet port adapted to permit air under pressure to enter said camber tangentially to the direction of rotation of said weight and having an outlet port, a second unbalanced weight carried on said shaft, and a spring-retarded brake-shoe mounted rotatably on said second weight, said brake-shoe being positioned to engage an annular member extending from an end plate frictionally upon rotation of said weights at a predetermined speed, and to be released from such engagement upon decrease of the speed of rotation of said weights below a predetermined rate, and calibrated means to predetermine the retarding force of said spring.

RIE HIGH,
*Executrix of the Estate of Jurjen S. High, Deceased.*

REFERENCES CITED

The following references are of record in the file of this patent:

UNITED STATES PATENTS

| Number | Name | Date |
|---|---|---|
| 1,346,221 | Liedtke | July 13, 1920 |
| 1,893,126 | Bogopolsky | Jan. 3, 1933 |
| 1,958,884 | Bonanno | May 15, 1934 |
| 2,142,237 | Canady | Jan. 3, 1939 |